May 23, 1950 W. A. SCHAPER 2,508,840

PERMEABILITY TUNER MECHANISM

Filed April 19, 1947 2 Sheets-Sheet 1

Inventor:
William A. Schaper,
By Dawson, Booth and Spangenberg,
Attorneys.

May 23, 1950 W. A. SCHAPER 2,508,840

PERMEABILITY TUNER MECHANISM

Filed April 19, 1947 2 Sheets-Sheet 2

Inventor:
William A. Schaper,
By Dawson, Booth and Spangenberg,
Attorneys.

Patented May 23, 1950 2,508,840

UNITED STATES PATENT OFFICE 2,508,840

PERMEABILITY TUNER MECHANISM

William A. Schaper, Phoenix, Ariz., assignor to Aladdin Industries, Incorporated, a corporation of Illinois Application April 19, 1947, Serial No. 742,563

4 Claims. (Cl. 74—10.7)

This invention is directed to improvements in permeability tuning mechanisms for radio purposes wherein a ferro-magnetic core or cores are moved relatively to an inductance coil or coils to vary the inductance thereof for permeability tuning purposes.

This application is a continuation in part of my copending application, Patent No. 2,503,220 issued April 4, 1950, and discloses and claims a further form of permeability tuning mechanism than those shown in my copending application.

The principal object of this invention is to provide an improved permeability tuning mechanism having, among other features, an improved mechanism for converting rotary motion of a control shaft into longitudinal movement of the ferro-magnetic cores with respect to the associated inductance coils.

In carrying out this object of the invention the permeability tuning mechanism preferably includes a frame having parallel side walls, coil forms supported by said frame between the side walls and parallel thereto, tuning cores movable axially in said coil forms, a cross-head extending transversely of said side walls and mounted for movement longitudinally of said side walls, and rods connecting said cross-head to said tuning core. A pair of parallel extensions are provided on the cross-head adjacent the side walls and these extensions are preferably at least as long as the longitudinal movement of the cross-head. A shaft extends between the side walls and is provided with a pair of drums in alignment with the cross-head extensions and between the ends thereof. A flexible band is provided around each of the drums and connected to the ends of the associated cross-head extensions for imparting longitudinal movement to the cross-head upon rotary movement of the shaft.

Spring means may be provided for tensioning the flexible bands and for securing the same to the drums. By reason of this construction the cross-head is at all times maintained at right angles to the side walls of the frame to provide for equal linear movements of the tuning cores upon rotation of the control shaft for obtaining accurate permeability tuning for radio purposes.

An arcuate slot may be provided in the side wall adjacent one of the drums and the drum may be provided with a projection extending into the slot for limiting rotation of the shaft and hence longitudinal movement of the tuning core.

Further objects of this invention reside in the details of construction and the cooperative relation between the component parts of the permeability tuning mechanism.

Other objects and advantages will become apparent to those skilled in the art upon reference to the accompanying specification, claims, and drawings, in which—

Referring to the form of the invention illustrated in Figs. 1 to 5, the permeability tuning mechanism is generally designated at 10. It includes a frame having a bottom wall 11 and end walls 12 and 13, preferably made of sheet metal. Side walls 14 and 15, preferably made of insulating material, rest upon the bottom wall 11 and are secured to the end walls 12 and 13 by means of ears 16, 17 and 18, struck from the end walls 12 and 13 and the bottom wall 11 respectively.

Figures 1, 2, 3, 4, 5:
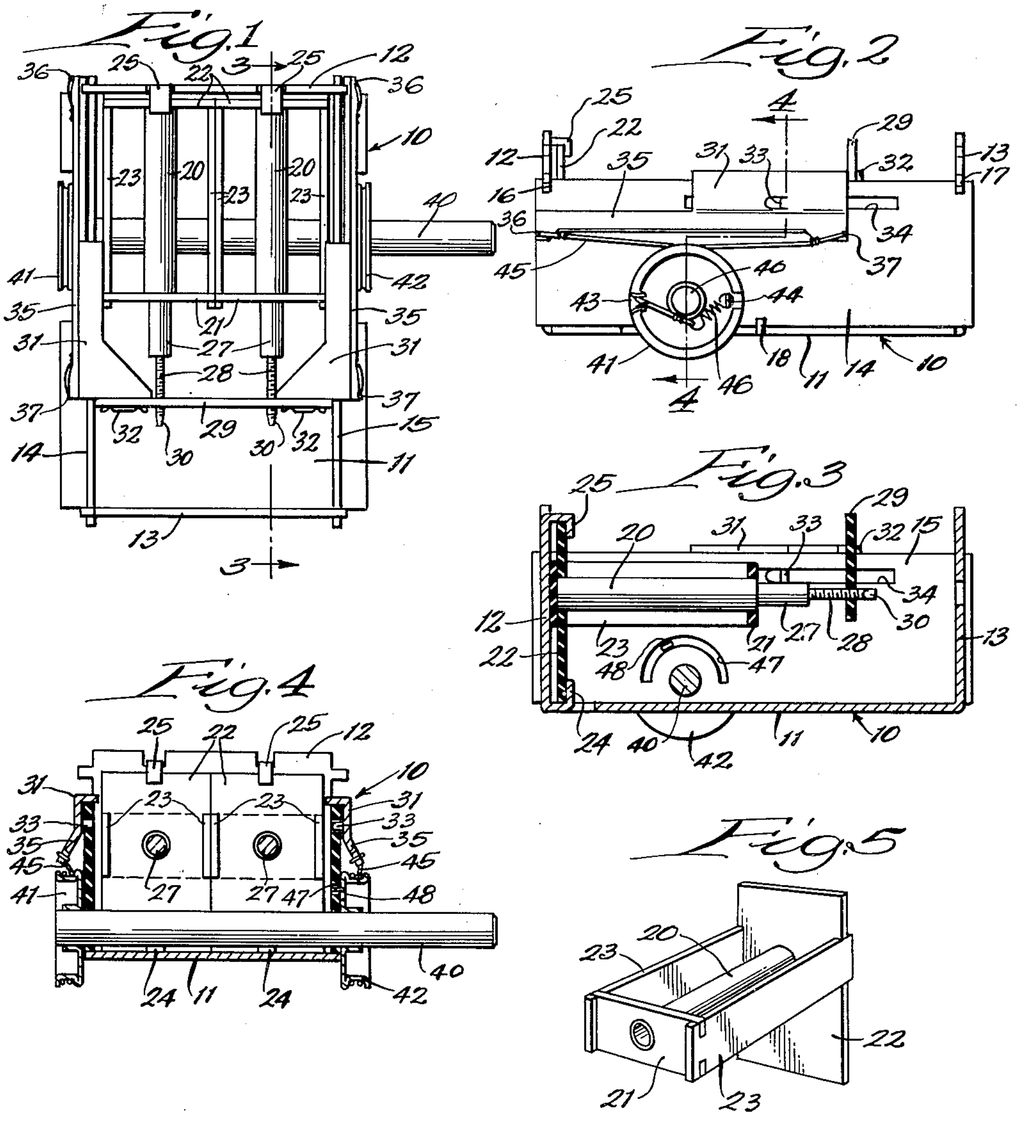
Fig. 1 is a plan view of one form of the invention.
Fig. 2 is a side elevational view looking from the left in Fig. 1.
Fig. 3 is a sectional view taken substantially along the line 3—3 of Fig. 1.
Fig. 4 is a sectional view taken substantially along the line 4—4 of Fig. 2.
Fig. 5 is a perspective view of the supporting mechanism for the coil forms.
Figure 6:
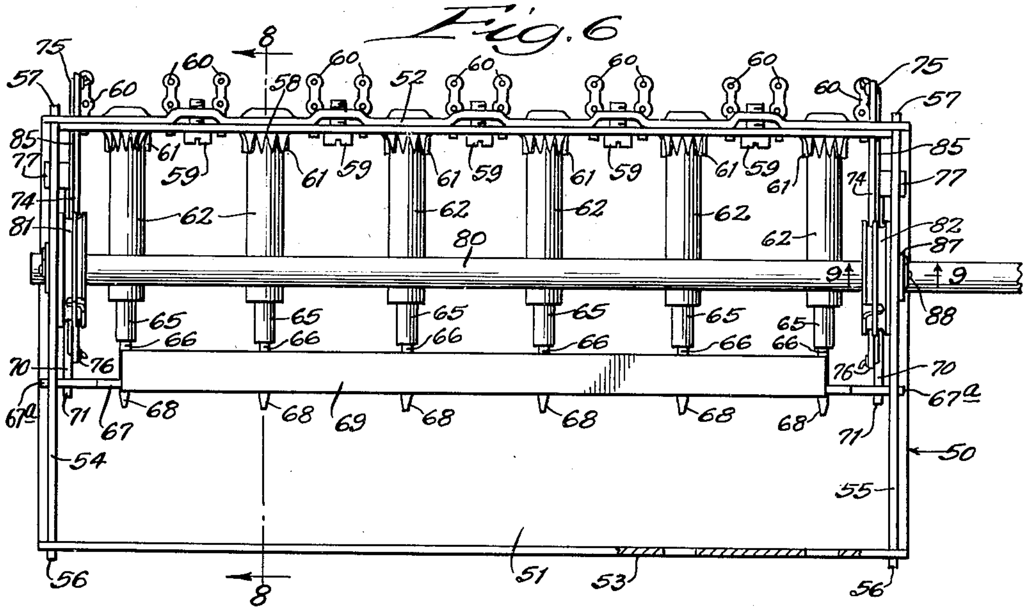
Fig. 6 is a plan view of another form of the invention.
Figure 7:
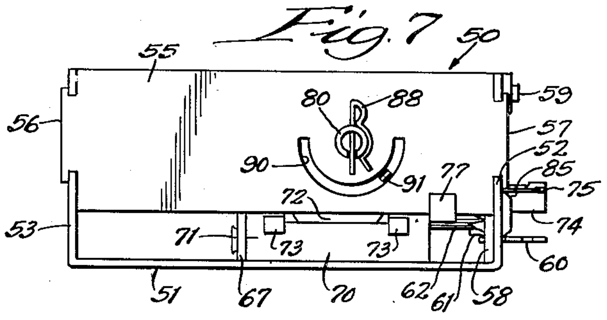
Fig. 7 is a side elevational view taken from the right of Fig. 6.
Figure 9:
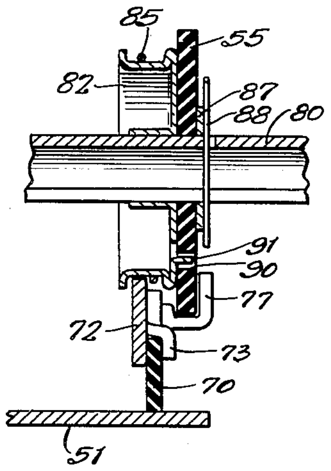
Fig. 9 is an enlarged sectional view taken substantially along the line 9—9 of Fig. 6.
Figure 8:
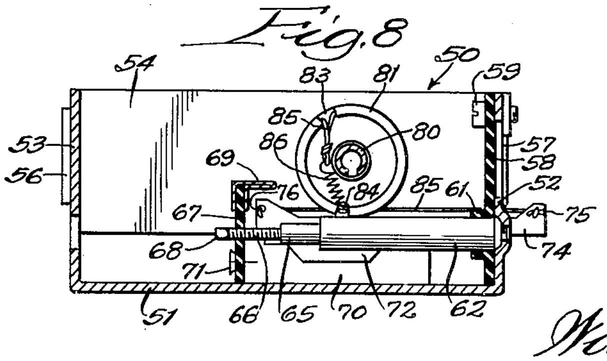
Fig. 8 is a sectional view taken substantially along the line 8—8 of Fig. 6.

In this form of the invention two coil forms 20 are utilized. These coil forms are made of insulating material and are secured to end supporting pieces 21 and 22, also made of insulating material. A strap 23 of insulating material encompasses the end supporting piece 22 and is secured to the end supporting piece 21. The coil forms 20 thus supported are secured to the end wall 12 of the frame by ears 24 and 25 struck from the bottom wall 11 and the end wall 12 respectively, as illustrated in Fig. 3. The ears 24 and 25 clamp the end supporting piece 22 in place against the end wall 12. Thus the coil forms 20 are securely held in place in the frame parallel to the side walls 14 and 15 of the frame and between the same.

The coil forms 20 carry inductance windings and the inductance of these windings is varied by means of longitudinally moving ferro-magnetic cores 27 received in the coil forms 20. The cores 27 are connected by screw threaded rods 28 to a cross-head 29 preferably formed of insulating material. The cross-head 29 is formed with tapped holes for receiving the screw threaded rods 28 and the positions of the cores 27 with respect to the cross-head 29 may be adjusted by manipulating the flattened ends 30 of the screw threaded rods 29. In this way the inductance of the coils may be relatively adjusted.

The cross-head 29 is secured to angle brackets 31 by means of lugs 32 carried by the brackets. The angle brackets 31 ride on the upper edges of the side walls 14 and 15 and are provided with ears 33 extending into slots 34 in the side walls 14 and 15. The cross-head and brackets are thereby guided for longitudinal movement along the side walls 14 and 15. The brackets 31 are also provided with extensions 35 having notches 36 and 37 at the ends thereof. The extensions 35, which extend along the side walls 14 and 15, are at least as long as the longitudinal movement to be imparted to the cores 27.

A shaft 40 is journaled in suitable holes in the side walls 14 and 15 and the shaft has secured thereto a pair of drums 41 and 42, which drums are in alignment with the extensions 35 and are located between the ends 36 and 37 of the extensions 35. The flanges of the drums 41 and 42 are provided with openings 43 and diametrically opposite the openings 43 the drums are provided with ears 44. Flexible bands 45, preferably in the form of cords, are secured in the notch 36 of the extensions 35, are wrapped about the drums 41 and 42, and are secured to the notches 37 in the extensions 35. Where the flexible band 45 traverses the hole 43 in the flange of the drums 41 and 42, it is drawn inwardly through the hole and is connected to a spring 46 attached to the ear 44. The spring 46 operates to tension the flexible band 45 and also to secure it to the drums 41 and 42.

The side wall 15 adjacent the drum 42 is provided with an arcuate slot 47 for receiving a lug 48 struck from the drum 42. The lug 48 cooperates with the arcuate slot 47 to limit rotation of the shaft 40 and hence limit the extent of longitudinal movement of the cross-head 29 and cores 27.

When the shaft 40 is rotated, the drums 41 and 42 and the flexible bands 45 impart longitudinal movement to the cross-head 29 and hence to the cores 27. Since the cross-head 29 is guided by the angle brackets 31 and is positively driven at each end by the pair of flexible bands 45, the cross-head 29 is at all times maintained at right angles to the side walls 14 and 15 so that identical motions are imparted to the cores 27.

In the other form of the invention, illustrated in Figs. 6 to 9, the permeability tuning mechanism is generally designated at 50. It includes a frame preferably formed of sheet metal, having a bottom wall 51 and end walls 52 and 53. Side walls 54 and 55, preferably made of insulating material are secured to the end walls 52 and 53 by lugs 56 and 57 formed on the side walls. A strip of insulating material 58 is secured to the inside of the end wall 52 by screws 59 and connecting lugs 60. The strip 58 is provided with inwardly extending lugs 61 struck therefrom for receiving the ends of coil forms 62. The coil forms 62 are inserted in the lugs 61 and are held in place therein by cement or other suitable adhesive material. The coil forms 62 are thus supported by the frame between the side walls thereof and parallel to the side walls. The coil form 62 may be provided with the usual inductance windings, the inductance of which may be varied by ferro-magnetic cores 65 received in the coil forms 62.

The cores 65 are provided with screw threaded rods 66 received in tapped holes in a cross-head 67, preferably made of insulating material. The positions of the cross 65 with respect to the cross-head 67 may be relatively adjusted by manipulation of the flattened ends 68 of the rods 66.

To add strength to the cross-head 67, it may be provided with an angle reinforcing member 69 which prevents bending of the cross-head. The cross-head 67 is provided with extensions 67ª extending between the bottom wall 51 and the side walls 54 and 55 whereby the cross-head is guided in its longitudinal movement. Side strips 70, also preferably formed of insulating material, are secured to the cross-head 67 by means of ears 71, the side strip 70 being parallel to and lying adjacent to the side walls 54 and 55. These side strips 70 also slide along the bottom wall 51 of the frame. Brackets 72 are secured to the side strips 70 by means of ears 73 and the brackets 72 are each provided with an extension 74 having end slots 75 and 76. The length of the extension 74 is at least as long as the movement to be imparted to the cores 65. The extensions 74 may also be provided with ears 77 extending underneath and engaging the outer sides of the side walls 54 and 55 to assist in guiding the longitudinal movement of the cross-head 67. The end wall 52 and the strip 58 may be provided with suitable openings to permit the extensions 74 to pass therethrough when the cores 65 are moved longitudinally into the coil forms 62.

A shaft 80 is suitably journaled in holes in the side walls 54 and 55 and the shaft 80 has secured thereto drums 81 and 82 inside of and adjacent to the side walls 54 and 55. The drums 81 and 82 are in alignment with the extensions 74 and are located between the ends 75 and 76 thereof. The flanges of the drums are provided with openings 83 and lugs 84. Flexible bands 85 are secured at one end in the slots 76, are wrapped about the drums 81 and 82, and are secured at their other ends in the slots 75. Where the flexible bands 85 traverse the holes 83 in the drums 81 and 82, they are drawn therethrough and connected by springs 86 to the lugs 84. The springs 86 operate to tension the flexible bands 85 and to secure them to the drums 81 and 82. Thus when the shaft 80 is rotated the flexible bands 85 and extensions 74 impart longitudinal movement to the cross-head 67 and the cores 65. The shaft 80 may be provided with washers 87 adjacent the side walls 54 and 55 held in place by cotter pins 88 to prevent longitudinal movement thereof with respect to the side walls 54 and 55.

The side wall 55 adjacent the drum 82 is preferably provided with an arcuate slot 90 for receiving a lug 91 struck from the drum 82. The slot 90 and lug 91 operate to limit the rotative movement of the shaft 80 and hence the longitudinal movement of the cross-head 67 and cores 65.

By reason of the foregoing mechanism, the cross-head 67 in its longitudinal movement is guided by the bottom wall 51 and the side walls 54 and 55 of the frame, and since the ends of the cross-head 67 are both positively driven by the bands 85, the cross-head is at all times maintained at right angles to the side walls 54 and 55 to impart equal increments of movement to the cores 65.

While for purposes of illustration, two forms of this invention have been disclosed, other forms thereof may become apparent to those skilled in the art upon reference to this disclosure, and, therefore, this invention is to be limited only by the scope of the appended claims and prior art.

I claim as my invention:

1. In a radio tuning device, an operating mechanism for converting rotary motion to rectilinear motion and for synchronously moving a plurality of tuning members rectilinearly with respect to a plurality of corresponding members parallelly supported by a supporting frame, said operating mechanism comprising, a supporting frame, side walls on the supporting frame parallel to said members, a cross-head extending transversely of and mounted for movement longitudinally of said side walls, rods connecting said cross-head to the tuning members, a pair of parallel extensions on said cross-head adjacent said side walls and at least as long as the longitudinal movement of the cross-head, a shaft extending between said side walls, a pair of drums secured to the shaft in alignment with said cross-head extensions and between the ends thereof, and a flexible band around each of said drums and connected to the ends of the associated cross-head extensions for imparting equal longitudinal movement to the ends of the cross-head upon rotary movement of the shaft.

2. In a radio tuning device, an operating mechanism for converting rotary motion to rectilinear motion and for synchronously moving a plurality of tuning members rectilinearly with respect to a plurality of corresponding members parallelly supported by a supporting frame, said operating mechanism comprising, a supporting frame, side walls on the supporting frame parallel to said members, a cross-head extending transversely of and mounted for movement longitudinally of said side walls, rods connecting said cross-head to the tuning members, a pair of parallel extensions on said cross-head adjacent said side walls and at least as long as the longitudinal movement of the cross-head, a shaft extending between said side walls, a pair of drums secured to the shaft in alignment with said cross-head extensions and between the ends thereof, a flexible band around each of said drums and connected to the ends of the associated cross-head extensions for imparting equal longitudinal movement to the ends of the cross-head upon rotary movement of the shaft, and spring means for tensioning the flexible bands and securing the same to the drums.

3. In a radio tuning device, an operating mechanism for converting rotary motion to rectilinear motion and for synchronously moving a plurality of tuning members rectilinearly with respect to a plurality of corresponding members parallelly supported by a supporting frame, said operating mechanism comprising, a supporting frame, side walls on the supporting frame parallel to said members, a cross-head extending transversely of and mounted for movement longitudinally of said side walls, rods connecting said cross-head to the tuning members, a pair of parallel extensions on said cross-head adjacent said side walls and at least as long as the longitudinal movement of the cross-head, a shaft extending between said side walls, a pair of drums secured to the shaft in alignment with said cross-head extensions and between the ends thereof, a flexible band around each of said drums and connected to the ends of the associated cross-head extensions for imparting equal longitudinal movement to the ends of the cross-head upon rotary movement of the shaft, an arcuate slot in the side wall adjacent one of the drums, and a projection on the drum extending into the arcuate slot for limiting rotation of the shaft.

4. In a radio tuning device, an operating mechanism for converting rotary motion to rectilinear motion and for synchronously moving a plurality of tuning members rectinilearly with respect to a plurality of corresponding members parallelly supported by a supporting frame, said operating mechanism comprising, a supporting frame, side walls on the supporting frame parallel to said members, a cross-head extending transversely of and mounted for movement longitudinally of said side walls, ears on the cross-head engaging the side walls to prevent tilting of the cross-head, rods connecting said cross-head to the tuning members, a pair of parallel extensions on said cross-head adjacent said side walls and at least as long as the longitudinal movement of the cross-head, a shaft extending between said side walls, a pair of drums secured to the shaft in alignment with said cross-head extensions and between the ends thereof, and a flexible band around each of said drums and connected to the ends of the associated cross-head extensions for imparting equal longitudinal movement to the ends of the cross-head upon rotary movement of the shaft.

WILLIAM A. SCHAPER.

REFERENCES CITED

The following references are of record in the file of this patent:

UNITED STATES PATENTS

| Number | Name | Date |
| --- | --- | --- |
| 2,217,984 | Kirk | Oct. 15, 1940 |
| 2,255,680 | Sands | Sept. 9, 1941 |
| 2,260,985 | Benton | Oct. 28, 1941 |
| 2,338,134 | Sands | Jan. 4, 1944 |